(12) United States Patent
Polato (10) Patent No.: US 10,500,764 B2
(45) Date of Patent: Dec. 10, 2019

(54) PLANT AND METHOD FOR DRYING AND SOLID STATE POLYCONDENSING OF POLYMERIC MATERIAL

(71) Applicant: Officine di Cartigliano SpA, Cartigliano (VI) (IT)

(72) Inventor: Antonio Polato, Marostica (IT)

(*) Notice: Subject to any disclaimer, the term of this patent is extended or adjusted under 35 U.S.C. 154(b) by 135 days.

(21) Appl. No.: 15/555,507

(22) PCT Filed: Mar. 14, 2016

(86) PCT No.: PCT/IB2016/051446
§ 371 (c)(1),
(2) Date: Sep. 3, 2017

(87) PCT Pub. No.: WO2016/147110
PCT Pub. Date: Sep. 22, 2016

(65) Prior Publication Data
US 2018/0043579 A1    Feb. 15, 2018

(30) Foreign Application Priority Data

Mar. 13, 2015    (IT) ................. VI2015A0070

(51) Int. Cl.
*B29B 13/08*    (2006.01)
*B01J 19/12*    (2006.01)
(Continued)

(52) U.S. Cl.
CPC ............ *B29B 13/08* (2013.01); *B01J 8/002* (2013.01); *B01J 8/003* (2013.01); *B01J 8/12* (2013.01);
(Continued)

(58) Field of Classification Search
CPC ..... B29B 13/08; B29B 9/16; B29B 2008/165; F26B 3/347; F26B 3/343; F26B 17/00;
(Continued)

(56) References Cited

U.S. PATENT DOCUMENTS 3,634,359 A    1/1972  Breitschaft
4,254,253 A    3/1981  Brent, Jr.
(Continued)

FOREIGN PATENT DOCUMENTS

DE    102005043526    3/2007
WO    2007131728    11/2007

*Primary Examiner* — Sanza L. McClendon
(74) *Attorney, Agent, or Firm* — Themis Law (57) ABSTRACT

A plant for drying and solid state polycondensing a granular moisture-containing polymeric material includes a conduit feeding material to be treated longitudinally, a treatment zone located along the conduit, a blower of an inert gas into the conduit, and a radiating device emitting an alternating electromagnetic field in the radio-frequency band to dry and upgrade the material. The radiating device includes applicators, located at the treatment zone and external to the conduit in longitudinally offset positions, which are connected to the terminals of an electromagnetic wave generator and include pairs of opposed radiating elements that generate an alternating electromagnetic field in the conduit, with field lines at least partially parallel to the direction of feed of the material, and that define magnetic dipoles with opposite polarities along the conduit. A method of drying and solid state polycondensing a polymeric material in granular form obtained by polycondensation using the plant.

14 Claims, 4 Drawing Sheets

(51) Int. Cl.
*F26B 3/347* (2006.01)
*B01J 8/00* (2006.01)
*F26B 17/00* (2006.01)
*F26B 3/34* (2006.01)
*B01J 8/12* (2006.01)
*B29B 9/16* (2006.01)
*B29C 35/08* (2006.01)
*B29K 67/00* (2006.01)
*B29K 77/00* (2006.01)

(52) U.S. Cl.
CPC ............... *B01J 19/129* (2013.01); *B29B 9/16* (2013.01); *B29C 35/0805* (2013.01); *F26B 3/343* (2013.01); *F26B 3/347* (2013.01); *F26B 17/00* (2013.01); *B01J 2208/00433* (2013.01); *B01J 2208/00469* (2013.01); *B01J 2219/0871* (2013.01); *B01J 2219/0879* (2013.01); *B01J 2219/1203* (2013.01); *B29B 2009/165* (2013.01); *B29C 2035/0861* (2013.01); *B29K 2067/003* (2013.01); *B29K 2077/00* (2013.01)

(58) Field of Classification Search
CPC ....... H05B 6/62; B01J 8/08; B01J 8/12; B01J 8/003; B01J 8/002; B01J 19/22; B01J 19/129; B01J 2208/00433; B01J 2208/00469; B01J 2219/0879; B01J 2219/1203; B29C 35/0805; B29C 2035/0861; B29K 2067/003; B29K 2077/00

See application file for complete search history.

(56) References Cited

U.S. PATENT DOCUMENTS

| | | | |
|---|---|---|---|
| 4,546,226 A | * | 10/1985 | Trembley ................ B29B 13/00 219/775 |
| 4,567,340 A | | 1/1986 | Latchum, Jr. |
| 5,420,404 A | | 5/1995 | Goodman |
| 5,950,325 A | | 9/1999 | Mehdizadeh |
| 6,316,518 B1 | | 11/2001 | Phipps |

* cited by examiner

PLANT AND METHOD FOR DRYING AND SOLID STATE POLYCONDENSING OF POLYMERIC MATERIAL

FIELD OF THE INVENTION

The present invention generally finds application in the field of treatment of polymeric materials, and particularly relates to a plant for drying and solid state polycondensing a polymeric material in granular form.

The invention further relates to a treatment method for drying and solid state polycondensing the aforementioned polymeric material.

BACKGROUND ART

Certain virgin and/or recycled polymeric materials, as used for molding plastic materials, are known to require treatment in appropriate plants for drying, upgrade and possibly crystallization.

Particularly, the materials selected for this purpose are polymers obtained by polycondensation reactions and selected from the group comprising polycondensates in general, such as: polyamides, elastomeric polyesters and PET and the term "upgrade" as used hereinafter is intended to designate the process of forming larger polymeric chains by repeated condensation reactions which occur in the solid state, to increase the molecular weight of polymers and, as a result, the inherent viscosity of the material.

Treatment plants generally use a plurality of treatment working stations in which a hot air stream flows through the polymeric materials to promote heating thereof to predetermined temperatures.

A first drawback of treatment plants is that the hot air that is used for thermally treating polymers causes an oxidation reaction which alters the structural or aesthetic characteristics of the material.

Furthermore, the material is heated using a plurality of distinct thermal stations cascaded along a product feed line, and this eventually increases the complexity and overall size of the plant.

In order to at least partially obviate the above mentioned drawbacks, a number of plants have been developed for thermal treatment of polymers by application of an electromagnetic field, generally in the radio-frequency (RF) band.

These plants are particularly suitable for treating polymerized-by-condensation materials, with temperature being controlled either by adjusting the electric parameters of the electromagnetic field, particularly frequency and/or power, or by adjusting the field application time.

Thermal treatment of polymers by a RF electromagnetic field has the effect of removing the water that is naturally contained in the material to increase its molecular weight and provide a high-strength, high-viscosity polymer.

U.S. Pat. No. 6,316,518 discloses a plant for thermal treatment of polymers, e.g. polyesters, polyamides and polyurethanes, comprising a feed conduit for the polymeric material to be treated and two treatment stations along the feed conduit.

Each of the stations comprises an applicator for emitting a radio-frequency electromagnetic field of predetermined power, which is adapted to heat the polymeric material to a temperature ranging from 190° C. to 205° C.

Particularly, the electromagnetic field generated by the electrodes has a frequency of about 40 MHz and its application time is of about 30 minutes per kilogram of material being treated.

Furthermore, the plant comprises means for blowing nitrogen into the treatment stations, in order to remove moisture that forms during the material polymerization reactions.

A first drawback of this arrangement is that the electromagnetic field generated by applicators is not uniform and cannot ensure optimal heating of the polymeric material that passes through the conduit.

This drawback hinders the drying and solid state polycondensing processes, whereby the polymeric materials being treated are found to have a very low molecular weight.

A further drawback is that, since the electromagnetic flux lines are transverse relative to the feed of the material in the conduit, the flow rate of the material shall be very low to ensure treatment of the polymeric material that is being fed therein, which can be obtained by reducing the diameter of the conduit.

This drawback will further increase the overall times required for thermal treatment of the polymeric material.

Furthermore, due to the particular conformation of the electromagnetic field being used, this plant has a very low thermal efficiency and a very high overall consumption.

TECHNICAL PROBLEM

In light of the prior art, the technical problem addressed by the present invention consists in providing thermal treatment of a polymeric material in granular form, obtained by polycondensation, to promote uniform drying and solid state polycondensing thereof, in a very short time and with high thermal efficiency.

DISCLOSURE OF THE INVENTION

The general object of the present invention is to solve the above discussed technical problem by obviating the drawbacks of the prior art.

A particular object is to provide a plant for drying and solid state polycondensing a polymeric material in granular form, that is highly efficient and relatively cost-effective.

Another particular object of the present invention is to provide a plant as mentioned above, that can ensure uniform thermal treatment of the polymeric material.

A further object of the present invention is to provide a plant for drying and solid state polycondensing a polymeric material that ensures a high thermal efficiency.

Another object of the present invention is to provide a plant as mentioned above that has a simple structure and can be easily managed.

Yet another object of the present invention is to provide a method of drying and solid state polycondensing a polymeric material that has very short overall treatment times.

These and other objects, as better explained hereafter, are fulfilled by a plant for drying and solid state polycondensing a polymeric material in granular form obtained by polycondensation as defined in claim 1, which comprises a feed conduit for the material to be treated, means for blowing an inert gas into the conduit, and a plurality of radiating means for emitting an alternating electromagnetic field in the radio-frequency band.

The radiating means comprise a plurality of applicators arranged along and external to the conduit at respective treatment stations, each applicator comprising a pair of opposed radiating elements for generating a radio-frequency electromagnetic field in the conduit, with field lines at least partially parallel to the feed direction of the material.

In a further aspect, the invention relates to a method of drying and solid state polycondensing such polymeric material, as defined in claim 11.

Advantageous embodiments of the invention will be defined in the dependent claims.

BRIEF DESCRIPTION OF THE DRAWING

Further characteristics and advantages of the invention will be more apparent upon reading of the detailed description of a preferred, non-exclusive embodiment of a plant and a method for drying and solid state polycondensing a polymeric material in granular form according to the invention, which is described as a non-limiting example with the help of the annexed drawings, in which.

DETAILED DESCRIPTION OF A PREFERRED EMBODIMENT

Referring to the aforementioned figures, a plant for drying and solid state polycondensing a moisture-containing polymeric material M is shown and generally designated by numeral 1.

The materials that can be treated by the plant 1 belong to the group of the polymers that can polymerize by condensation polymerization, such as polyamides and polyesters.

Particularly, as shown in Table I below, the polymers that exhibit a highly reduced inherent moisture upon drying and a considerably increased viscosity upon solid state polycondensing are polyamide 6 as obtained by ring-opening polycondensation, elastomeric polyesters obtained by polycondensation of an ester of a dicarboxylic acid and a soft segment such as PTMG, PET and other similar polymers.

The polymeric material M to be treated may further be in granular form, which will increase the exchange surface for thermal treatment.

In a preferred embodiment of the invention, the plant 1 comprises a feed conduit 2 for feeding the material M to be treated in a predetermined longitudinal direction L, and located between an inlet station and an outlet station, not shown.

Figure 1:
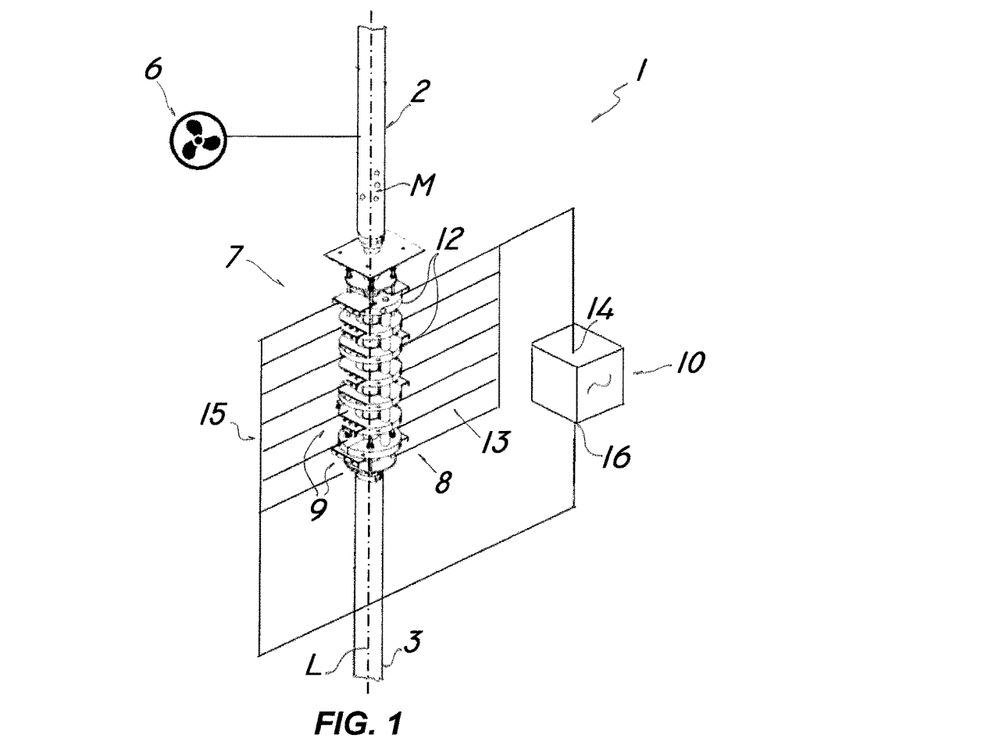
FIG. 1 is a schematic perspective view of the plant for drying and solid state polycondensing a solid polymeric material of the invention according to a first embodiment.

Advantageously, as shown in FIG. 1, the conduit 2 may comprise a wall 3 made of a dielectric material and may extend in a substantially vertical direction L to facilitate natural gravity feed of the material M.

Figure 3:
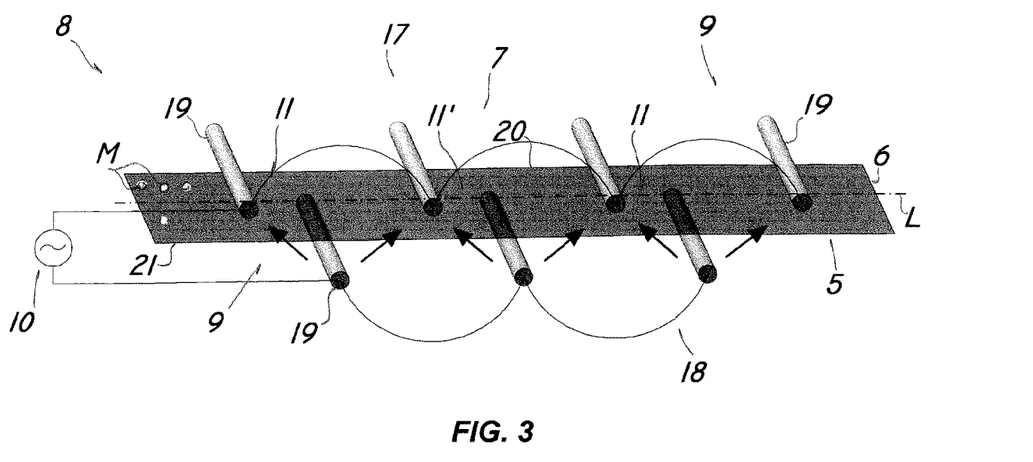
FIG. 3 is a schematic perspective view of the plant for drying and solid state polycondensing the polymeric material according to a second embodiment.
Figure 4:
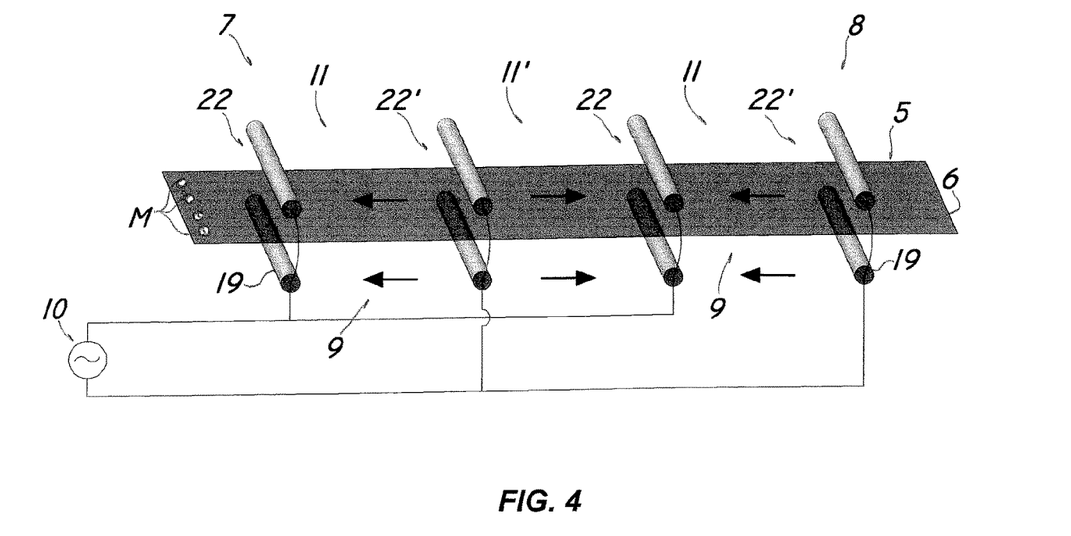
FIG. 4 is a schematic perspective view of the plant for drying and solid state polycondensing the polymeric material according to a third embodiment.

Alternatively, means 4 may be provided for forced feeding of the material M, which are located in the conduit 2 and are selected from the group comprising augers or Archimedean screws, not shown, or the belt conveyors 5, as shown in FIGS. 3 and 4.

Furthermore, the conduit 2 may have an inside diameter ranging from 20 mm to 60 mm, preferably of about 40 mm, affording a feed flow of polymeric material ranging from 4 to 11 kg/h.

According to a further embodiment of the invention, not shown, the conduit 2 may comprise a plurality of substantially radial wings therein, arranged in the longitudinal direction, to cause mixing of the polymeric material M while it is being fed.

Conveniently, loading means, not shown, may be provided at the inlet station, for introducing the polymeric material M, which means may comprise a hopper with a discharge passage level with the inlet station, and means for controlling the flow rate of material into the conduit.

Blower means 6 may be also provided for blowing an inert gas into the conduit 2 to facilitate removal of the moisture that has come out of the polymeric material M upon drying.

The inert gas may be selected from the group comprising argon and nitrogen and the conduit 2, the loading station and the discharge station must be obviously isolated from the external environment, for a controlled atmosphere to be maintained therein.

Therefore, as the material M is being fed in the conduit 2, the moisture removed therefrom will not be reintroduced into the polymers, and the reaction kinetics of condensation processes will not be reversed.

The plant 1 further comprises at least one treatment zone 7 situated along the conduit 2 and radiating means 8 for emitting an alternating electromagnetic field in the radio-frequency band, for thermal treatment of the polymeric material M, such that it can be dried and polycondensed, as best shown in FIGS. 1 to 4.

The electromagnetic field may have a fixed frequency ranging from 5 MHz to 50 MHz, preferably from 25 MHz to 29 MHz, more preferably of about 27.12 MHz.

In addition to affording effective drying and solid state polycondensing of the polymeric material M, these frequency values provide higher safety as compared with plants that use different electromagnetic fields, e.g. in the microwave range.

The radiating means 8 comprise a plurality of applicators 9, located I correspondence of the treatment zone 7 outside the conduit 2 and in longitudinally offset positions, and are connected to the terminals of an electromagnetic wave generator 10 whose power ranges from 10 kV/m to 20 kV/m.

Furthermore, the generator 10 shall be of such a size as to be able to generate an alternating current of adjustable amplitude, to thereby obtain such electromagnetic field values.

Figure 5:
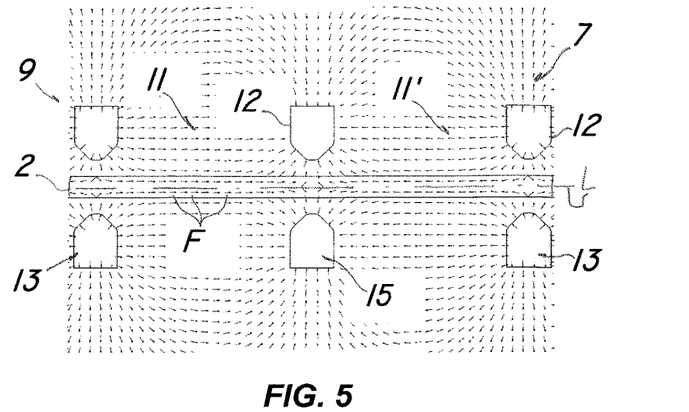
FIGS. 5 to 7 are sectional side views of the plant in its three embodiments, comprising the flux lines of the electromagnetic fields that have been generated.
Figure 6:
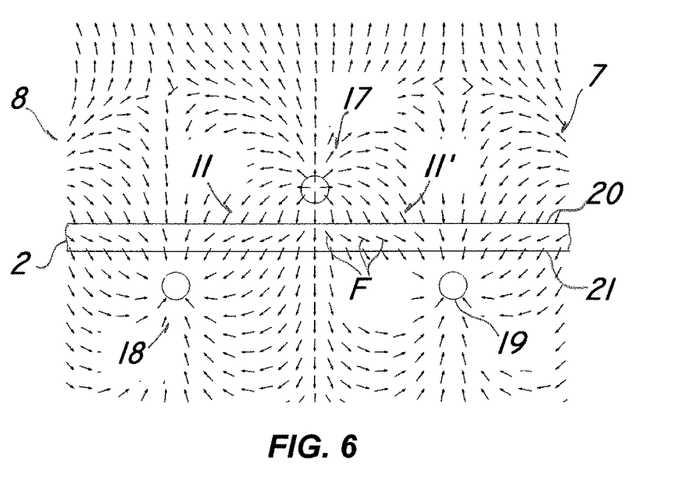
Figure 7:
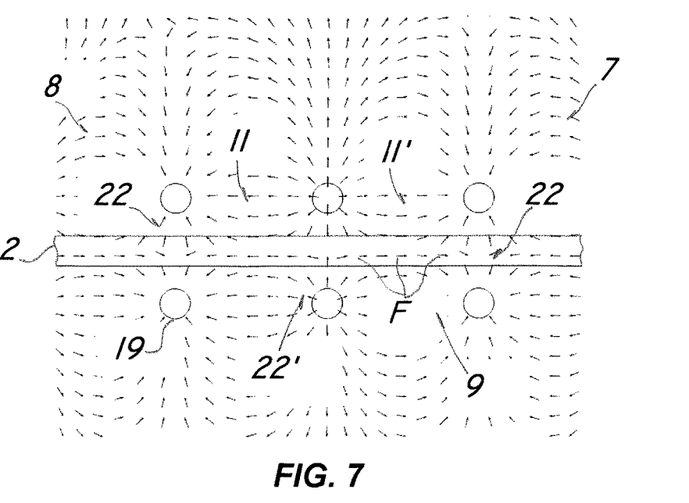

According to a peculiar aspect of the invention, the applicators comprise pairs of opposed radiating elements 11, 11', which are adapted to generate an alternating electromagnetic field in the conduit 2, with field lines F at least partially parallel to the direction of feed L of the material M and defining magnetic dipoles with opposite polarities along the conduit 2, as best shown in FIGS. 5 to 7.

Thus, the electromagnetic field so generated is able to uniformly treat the polymeric material M that is being fed along the conduit 2, with a homogeneous temperature distribution, thereby considerably reducing inherent moisture and increasing the viscosity of the material in very short times.

Figure 2:
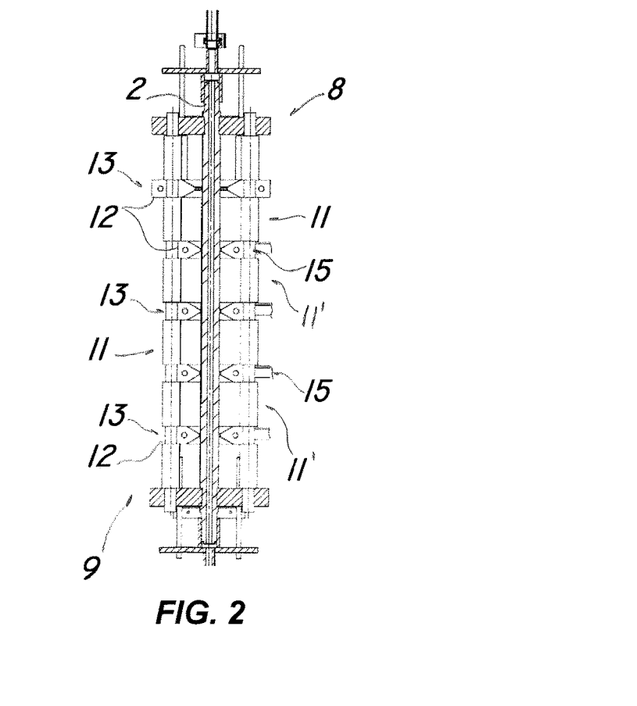
FIG. 2 is a sectional side view of a first detail of FIG. 2.

In a first embodiment of the invention, as shown in FIG. 2, the radiating elements 11 consist of rings 12 of conductive material, extending substantially perpendicular to the axis L of the conduit 2.

Particularly, the rings 12 are divided into a first series 13 of rings 12 connected in parallel with one of the terminals 14 of the generator 10 and a second series 15 of rings 12 connected to the other terminal 16 of the generator 10.

The rings 12 of each series 13, 15 are alternately arranged along the longitudinal extent of the conduit 2 to form respective pairs 11, 11' of radiating elements with opposite polarities.

In a second embodiment of the invention, as shown in FIG. 3 and preferably used in combination with a belt conveyor 5 as a feed means, the radiating elements 11 consist of two series 17, 18 of bars 19 made of an electrically conductive material and extending transverse to the conduit 2.

lines F at least partially parallel to the feed direction L of the material M, and having magnetic dipoles with opposite polarities between each radiating element 11 and the one 11' next to it.

The treatment zone 7 is maintained at such a temperature as to cause the material M to be heated to a temperature ranging from 120° C. to 180° C., whereas the feed flow is adjusted for the material M to be kept within the conduit 2 for a time ranging from 30 s to 7 minutes, with an average flow rate ranging from 4 to 11 kg/h.

The following table shows the treatment conditions for the polymeric material M and the drying and solid state polycondensing results obtained for each sample.

| Product | Flow rate (kg/h) | Initial moisture (%) | Final moisture (%) | Initial temperature (° C.) | Final temperature (° C.) | Initial viscosity | Final viscosity |
|---|---|---|---|---|---|---|---|
| A1 - Polyamide 6 | 10 | 2.0 | 0.5 | 23° C. | 140° C. | 2.4 | 2.4 |
| A2 - Polyamide 6 | 8 | 2.0 | 0.003 | 23° C. | 150° C. | 2.4 | 2.45 |
| A3 - Polyamide 6 | 8 | 2.0 | 0.002 | 23° C. | 180° C. | 2.4 | 3.1 |
| B1 Elastomeric polyester | 5 | 0.7 | 0.005 | 23° C. | 120° C. | | |
| B2 Elastomeric polyester | 5 | 0.7 | 0.003 | 23° C. | 130° C. | | |
| C1 - PET | 10 | 2.5 | 0.5 | 23° C. | 130° C. | 0.65 | 0.65 |
| C2 - PET | 8 | 2.5 | 0.003 | 23° C. | 150° C. | 0.65 | 0.65 |
| C3 - PET | 8 | 2.5 | 0.002 | 23° C. | 180° C. | 0.7 | 1.0 |

The two series 17, 18 are placed at the transversely opposite sides 20, 21 of the conduit 2 and are connected to first 14 and second 16 terminals of the generator 10 respectively, such that the pairs 11, 11' of radiating elements are alternately arranged in diametrically and longitudinally offset positions.

In a third embodiment of the invention, as shown in FIG. 4, the radiating elements 11 consist of longitudinally offset pairs 22 of bars 19 made of a conductive material, which are placed transverse to the conduit 2 in diametrically opposite positions.

In this embodiment, the bars 19 include a first series of pairs 22 connected, in parallel to each other, to a terminal 14 of the generator 10 and a second series of pairs 22' connected, in parallel to each other, to the other terminal 16 of the generator 10.

Furthermore, the pairs 22, 22' of bars 19 with opposite polarities are alternated and in longitudinally offset positions to define the pairs of radiating elements 11, 11' with opposite polarities.

Figure 8:
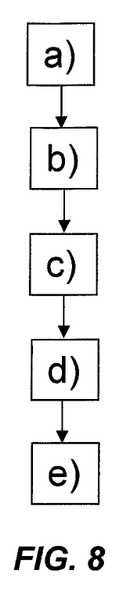
FIG. 8 is a block diagram of the method of drying and solid state polycondensing the solid polymeric material according to the invention.

In a further aspect, as shown in FIG. 8, the invention provides a method of drying and solid state polycondensing a polymeric material M in granular form obtained by polycondensation, using the aforementioned plant 1, and comprising a step a) of providing a predetermined amount of the polymeric material M to be treated and a step b) of introducing the polymeric material M into the conduit 2.

These steps are followed by a step c) of feeding the polymeric material M along the conduit 2 to the treatment zone 7, a step d) of actuating the generator 10 and generating a radio-frequency electromagnetic field using the radiating elements 11, for thermal treatment of the material M and finally a step e) of blowing an inert gas into the conduit 2 to facilitate solid state polycondensing of the polymeric material M, in combination with the electromagnetic field.

The radiating elements 11 are designed to generate an alternating electromagnetic field in the conduit 2, with field It shall be noted that, for all the samples being treated, the plant can ensure a considerable reduction of inherent moisture, while limiting the final temperature of the material.

It shall be further noted that, for the samples A3 and C3 that were blown with nitrogen within the conduit, a significant increase of viscosity is observed, which indicates that solid state polycondensing has occurred.

The above disclosure shows that the plant and method of the invention fulfill the intended objects and particularly meets the requirement of affording quick and effective curing of the polymeric material.

The plant and method of the invention are susceptible to a number of changes or variants, within the inventive concept disclosed in the appended claims. All the details thereof may be replaced by other technically equivalent parts, and the materials may vary depending on different needs, without departure from the scope of the invention.

While the plant and method have been described with particular reference to the accompanying figures, the numerals referred to in the disclosure and claims are only used for the sake of a better intelligibility of the invention and shall not be intended to limit the claimed scope in any manner.

INDUSTRIAL APPLICABILITY

The present invention may find application in industry, because it can be produced on an industrial scale in polymer processing and recycling factories.

The invention claimed is:
1. A plant (1) for drying and solid state polycondensing a moisture-containing polymeric material (M) in granular form, comprising:
  a conduit (2) feeding the polymeric material (M) to be treated in a longitudinal direction (L);
  at least one treatment zone (7) for treating the polymeric material (M), at least one treatment zone (7) being located along said conduit (2);

a blower (6) blowing an inert gas into said conduit (2); and a radiating device (8) emitting an alternating electromagnetic field in a radio-frequency band, for thermal treatment of the polymeric material (M), such that the polymeric material can be dried and upgraded;

wherein said radiating device (8) comprises a plurality of applicators (9) located in correspondence of said treatment zone (7) and external to said conduit (2), in longitudinally offset positions, said applicators (9) being connected to an electromagnetic wave generator (10);

wherein said applicators (9) comprise pairs of opposed radiating elements (11, 11') each connected to a respective terminal (14, 16) of said electromagnetic wave generator (10), said radiating elements (11, 11') being substantially perpendicular to said longitudinal direction (L) to provide field lines (F) at least partially parallel to a direction of feed (L) of the material (M) and to define magnetic dipoles with opposite polarities along said conduit (2), and wherein said radiating elements (11, 11') consist of rings (12) made of a conductive material, and disposed substantially perpendicular to an axis (L) of said conduit (2).

2. The plant as claimed in claim 1, wherein said rings (12) comprise a first series (13) of rings (12) connected in parallel to one of the terminals (14) of said generator (10) and a second series (15) of rings (12) connected in parallel to another terminal (16) of said generator (10), said first and said second series (13, 15) being in alternate arrangement.

3. A plant (1) for drying and solid state polycondensing a moisture-containing polymeric material (M) in granular form, comprising:

a conduit (2) feeding the polymeric material (M) to be treated in a longitudinal direction (L);

at least one treatment zone (7) for treating the polymeric material (M), at least one treatment zone (7) being located along said conduit (2);

a blower (6) blowing an inert gas into said conduit (2); and a radiating device (8) emitting an alternating electromagnetic field in a radio-frequency band, for thermal treatment of the polymeric material (M), such that the polymeric material can be dried and upgraded;

wherein said radiating device (8) comprises a plurality of applicators (9) located in correspondence of said treatment zone (7) and external to said conduit (2), in longitudinally offset positions, said applicators (9) being connected to an electromagnetic wave generator (10);

wherein said applicators (9) comprise pairs of opposed radiating elements (11, 11') each connected to a respective terminal (14, 16) of said electromagnetic wave generator (10), said radiating elements (11, 11') being substantially perpendicular to said longitudinal direction (L) to provide field lines (F) at least partially parallel to a direction of feed (L) of the material (M) and to define magnetic dipoles with opposite polarities along said conduit (2), and wherein radiating elements (11, 11') consist of pairs (22) of bars (19) made of an electrically conductive material, and extending substantially transverse to said conduit (2).

4. The plant as claimed in claim 3, wherein said pairs (22) of bars (19) comprise a first series of pairs (22) connected, in parallel to each other, to one terminal (14) of said generator (10) and a second series of pairs (22') connected, in parallel to each other, to another terminal (16) of said generator (10), said pairs (22, 22) of bars (19) being in alternate arrangement and in longitudinally offset positions.

5. The plant as claimed in claim 3, wherein said radiating elements (11) consist of bars (19) made of an electrically conductive material, placed in alternate arrangement at one of transversely opposite sides (20, 21) of said conduit (2) and in longitudinally offset relationship.

6. The plant as claimed in claim 5, wherein said bars (19) comprise a first series (17) of bars connected, in parallel to each other, to one terminal (14) of said generator (10) and a second series (18) of bars connected, in parallel to each other, to another terminal (16) of said generator (10), said pairs (11, 11') of bars (19) being in alternate arrangement and in diametrically and longitudinally offset positions.

7. The plant as claimed in claim 1, wherein said conduit (2) comprises a side wall (3) made of a dielectric material and extending in a substantially vertical direction (L) to facilitate natural gravity feed of the polymeric material (M), said conduit (2) having an inside diameter ranging from 20 mm to 60 mm.

8. The plant as claimed in claim 1, further comprising a system (4) that force-fees the polymeric material (M), located within said conduit (2), wherein said system (4) is selected from the group consisting of augers, Archimedean screws, and belt conveyors (5).

9. The plant as claimed in claim 1, wherein said conduit (2) comprises a plurality of substantially radial wings therein, arranged in the longitudinal direction, to cause mixing of the polymeric material (M) while the polymeric material is being fed.

10. A method of drying and solid state polycondensing a polymeric material (M) in granular form obtained by polycondensation, the method comprising the steps of:

providing a plant comprising, a conduit (2) feeding the polymeric material (M) to be treated in a longitudinal direction (L), at least one treatment zone (7) for treating the polymeric material (M), at least one treatment zone (7) being located along said conduit (2), a blower (6) blowing an inert gas into said conduit (2), and a radiating device (8) emitting an alternating electromagnetic field in a radio-frequency band, for thermal treatment of the polymeric material (M), such that the polymeric material can be dried and upgraded, wherein said radiating device (8) comprises a plurality of applicators (9) located in correspondence of said treatment zone (7) and external to said conduit (2), in longitudinally offset positions, said applicators (9) being connected to an electromagnetic wave generator (10), and wherein said applicators (9) comprise pairs of opposed radiating elements (11, 11') each connected to a respective terminal (14, 16) of said electromagnetic wave generator (10), said radiating elements (11, 11') being substantially perpendicular to said longitudinal direction (L) to provide field lines (F) at least partially parallel to a direction of feed (L) of the material (M) and to define magnetic dipoles with opposite polarities along said conduit (2);

providing a predetermined amount of the polymeric material (M) to be treated;

introducing said predetermined amount of the polymeric material (M) to be treated into said conduit (2);

feeding the polymeric material (M) along said conduit to said at least one treatment zone (7) equipped with said radiating elements (11, 11');

actuating said generator (10) and generating a radio-frequency electromagnetic field onto the polymeric material (M) using said applicators (9) for the thermal treatment of the polymeric material (M);

blowing the inert gas into said conduit (2) to facilitate solid state polycondensing of the polymeric material (M), in combination with said electromagnetic field;

wherein said radiating elements (11, 11') are designed to generate the alternating electromagnetic field in said conduit (2), with the field lines (F) at least partially parallel to the feed direction (L) of the material (M), wherein said alternating electromagnetic field has the magnetic dipoles with opposite polarities between a first radiating element (11) and a second radiating element (11') next to the first radiating element, wherein said treatment zone (7) is maintained at an average temperature ranging from 120° C. to 180° C., and wherein a feed flow of the polymeric material (M) is adjusted to keep the polymeric material (M) to be treated within said conduit (2) for a time ranging from 30 sec to 7 minutes with an average flow rate of the polymeric material ranging from 4 to 11 kg/h.

11. The plant as claimed in claim 3, wherein the bars in each pair are disposed in diametrically opposite positions.

12. The plant as claimed in claim 3, wherein said conduit (2) comprises a side wall (3) made of a dielectric material and extending in a substantially vertical direction (L) to facilitate natural gravity feed of the polymeric material (M), said conduit (2) having an inside diameter ranging from 20 mm to 60 mm.

13. The plant as claimed in claim 3, further comprising a system (4) that force-fees the polymeric material (M), located within said conduit (2), wherein said system (4) is selected from the group consisting of augers, Archimedean screws, and belt conveyors (5).

14. The plant as claimed in claim 3, wherein said conduit (2) comprises a plurality of substantially radial wings therein, arranged in the longitudinal direction, to cause mixing of the polymeric material (M) while the polymeric material is being fed.

* * * * *